United States Patent

[11] 3,543,758

[72] Inventor Daniel M. McWhorter
Arlington Heights, Illinois
[21] Appl. No. 660,407
[22] Filed Aug. 14, 1967
[45] Patented Dec. 1, 1970
[73] Assignee The Kendall Company
Boston, Massachusetts
a corporation of Massachusetts

[54] CATHETER WITH SAFETY INDICATOR
5 Claims, 3 Drawing Figs.
[52] U.S. Cl. .................................... 128/349, 128/246
[51] Int. Cl. .................................... A61m 25/00
[50] Field of Search .......................... 128/348—351, 325, 246, 344

[56] References Cited
UNITED STATES PATENTS
2,473,742 6/1949 Auzin ........................ 128/349
3,044,468 7/1962 Birtwell ..................... 128/349
3,407,817 10/1968 Galleher .................... 128/351

Primary Examiner—Dalton L. Truluck
Attorneys—Jerome M. Teplitz, Robert D. Chodera and T. W. Underhill ABSTRACT: An inflatable balloon-type retention insertion tube, such as a catheter, for insertion into an animal body channel wherein the portion of the insertion tube visible outside of the body is provided with a signal means which indicates when the retention balloon is misplaced or the pressure therein has reached a preselected value and prevents further inflation of the retention balloon which would cause trauma or rupture of the channel walls. The signal means is a formed dilatation in the lumen transmitting the inflation fluid to the retention balloon, and visibly inflates when a preselected pressure is reached within the lumen.

Patented Dec. 1, 1970
3,543,758
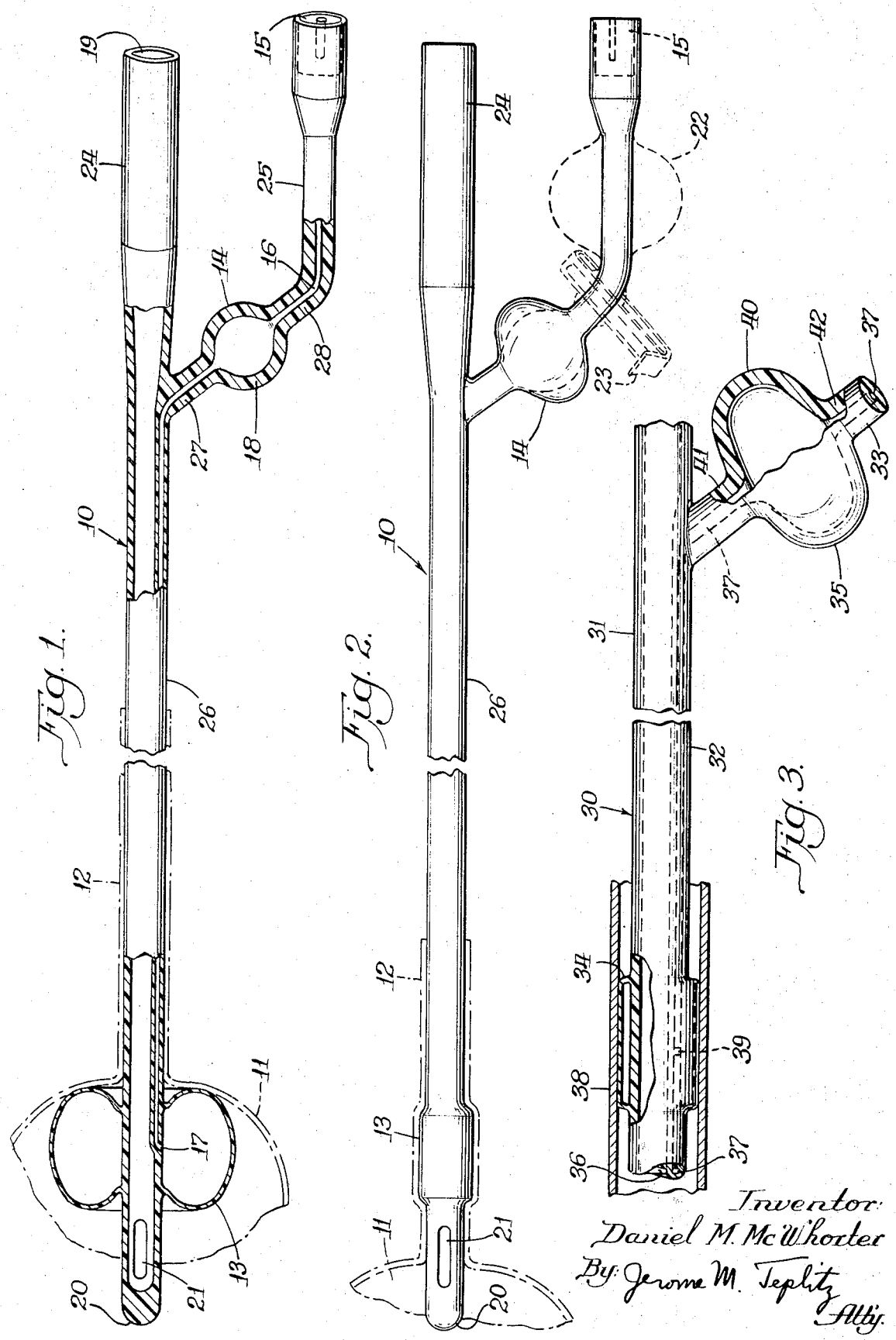
Inventor
Daniel M. McWhorter
By Jerome M. Teplitz
Atty.

CATHETER WITH SAFETY INDICATOR

This invention is concerned with insertion tubes which are intended to be inserted into body channels and which have inflatable retention means adjacent their insert ends.

Some such insertion tubes presently utilized are intended to be retained in body channels by partial inflation of their retention means against the channel walls. Other such insertion tubes presently utilized as, for example, urinary catheters are not intended to have their retention means inflated until the inflatable means is within a body cavity. Nevertheless, urinary catheters are at times improperly inserted so that inflation of the retention means is initiated while the latter is still within the urethra. One of the recognized problems associated with partial inflation of retention means within a restricted body channel, whether the partial inflation be intentional or inadvertent, is that the force exerted by the inflation means, if excessive, may cause trauma or even rupture of the channel walls.

Applicant's copending application, Ser. No. 549,021, filed May 10, 1966, now abandoned, is directed to a solution of the above problem by providing such insertion tubes with signal means which indicates when the retention balloon is misplaced or the pressure therein has reached a preselected value and preferably also prevents any further inflation of the retention balloon. Several different signal means are disclosed, the most effective and practical of which consists of a second inflatable balloon extending externally of the walls of the lumen transmitting the inflation fluid to the retention balloon and having an opening into the lumen. By proper selection of the shape, dimensions, and thickness of the second balloon, it is adapted to inflate at an internal fluid pressure greater than that necessary to cause inflation of the retention balloon when the latter is unimpeded, and less than that necessary to cause inflation of the retention balloon when the latter is impeded by body tissue. Thus, when the retention balloon meets with resistance, the internal fluid pressure required to inflate it further, rises above the internal fluid pressure at which the second balloon inflates, thereby activating inflation of the second balloon. The second balloon thus effectively serves as a safety indicator and prevents the retention balloon from further inflating and causing trauma or rupture of the body tissue.

While the safety indicator balloon described above provides a very satisfactory solution to the problem, the incorporation of such an indicator into conventional inflatable retention catheters and other like insertion tubes, involves an increase in the cost of manufacturing such devices, in the form of additional manufacturing and testing steps and increased likelihood of rejects. As is well known in the art, the manufacture of rubber catheters is generally carried out by a latex dipping operation, and the formation of an inflatable balloon on the catheter is accomplished by coating a stripe, band, patch or other area on a partially completed catheter with a coating of a material such as bentonite surrounding a clay-filled hole. The bentonite coated area adheres only lightly, if at all, to further latex dip coats and causes a skin to be formed covering the hole through the inflation lumen. This skin, when the underlying coating material and the hole plug are washed away, is inflatable because it is deposited on and unifies with latex bordering the bentonite coated area. Thus, the forming of an additional inflatable balloon on the catheter requires additional manufacturing steps. Furthermore, each balloon must be individually tested for leakage and since most catheter rejections are due to faulty balloon structures, the addition of another balloon onto the catheter only increases the likelihood of its being rejected.

It is an object of this invention to provide an insertion tube with an expandable retention means which will expand fully or until its expansion is impeded by a resistance of a preselected amount.

Another object of the invention is to provide a urinary catheter with inflatable retention means which, if improperly positioned, with the retention means still in the urethra, cannot inflate sufficiently to damage the latter.

Another object of the invention is to provide a urinary catheter with inflatable retention means which will produce a visual signal as an indication of improper positioning when inflation of the retention means is attempted.

Another object of the invention is to provide an inflatable retention catheter of the character described in the foregoing objects which will have a construction capable of being manufactured as economically as the conventional inflatable retention catheters.

Other objects of the invention will be apparent from an inspection of the drawings and specification.

Referring now to the drawings:

FIG. 1 is a schematic representation showing a typical insertion tube of the invention properly positioned with its inflatable retention means inflated within a body cavity and the signal means unactivated.

FIG. 2 is a schematic representation of the insertion tube of FIG. 1 improperly positioned and with its signal means activated, indicating improper positioning.

FIG. 3 is an enlarged portion of a typical insertion tube of the invention wherein the retention means is intended to be partially inflated in a body channel and with the signal means activated.

The objects of the invention are attained by providing a formed dilatation in the inflation lumen of an inflatable retention catheter or other like insertion tube, in the portion extending outside of the body. By the term "formed dilatation" is meant a portion of the inflation lumen so constructed and formed during manufacture of the tube as to have an increased internal diameter in its normal unactivated, uninflated state. The manner in which such dilatation is formed in the inflation lumen will be described more fully hereinafter. The dilatation may be formed anywhere along the inflation lumen, so long as it visibly extends outside of the body when the tube is in use. In the conventional inflatable retention catheters wherein the inflation lumen branches off in a side arm from the main drainage lumen, the dilatation is conveniently and preferably formed in the side arm, although it may also be formed in the portion of the inflation lumen extending into the main arm and outside of the body when the catheter is in use. The wall thickness of the dilatation is substantially the same as the wall thickness of the adjacent portions of the inflation lumen and greater than the wall thickness of the retention balloon. By proper selection of the shape and dimensions of the dilatation, as explained more fully hereinafter, the dilatation is caused to be inflatable at an internal fluid pressure greater than that necessary to cause inflation of the retention balloon when the latter is unimpeded, and less than that necessary to cause inflation of the retention balloon when the latter is impeded by body tissue. Thus, when the insertion tube is inserted in the body and inflation is initiated, the inflation balloon, if unimpeded, will fully inflate. However, when the retention balloon meets with resistance, the pressure required to inflate it further, rises above the pressure at which the dilatation inflates, thereby activating inflation of the dilatation. The dilatation thus effectively serves as a safety indicator, visually signalling when the retention balloon is misplaced or the pressure therein has reached a preselected value and also preventing the retention balloon from further inflating and causing trauma or rupture of the body tissue.

Referring once more to the drawings:

In FIG. 1, a typical insertion tube of the invention in the form of a catheter 10 is shown schematically inserted into a body cavity such as the bladder 11, with the catheter tip 20, the drainage opening 21, and the inflated retention balloon 13 inside the bladder. A portion of the catheter lies within the urethra 12, but the catheter bell 24 and the inflation branch or arm 25 are outside the body. An inflation lumen 16 in the inflation branch 25 is continuous into the catheter main arm 26 and connects to the inflated retention balloon 13 through the hole 17 in the main arm 26 of the catheter. The signal means 14 on the inflation branch 25, shown in its unactivated and uninflated state, is a formed dilatation in the inflation lumen 16. The walls 18 of the signal means 14 are substantially the same thickness as the walls 27 and 28 of the adjacent portions of the inflation lumen and are greater in thickness than the walls of the retention balloon 13. A plug 15 which acts as a combination filling plug and stopper closes the lumen 16 in the inflation arm. The main arm 26 also contains a drainage lumen 19 which extends from the bell 24 to the drainage opening 21.

FIG. 2 shows the catheter of FIG. 1 improperly inserted so that the inflatable retention balloon 13 is still inside the urethra 12. This position, because of the urethral wall resistance, requires higher pressure to inflate the retention balloon. The pressure is able to rise only to that pressure at which the signal means 14 inflates, however, before the latter is activated. In FIG. 2, the signal means 14 is shown in its activated, inflated state, with its unactivated, uninflated state being shown constructively. Inflation of the signal means 14, therefore, gives visual warning that the retention balloon 13 is improperly placed and, in addition, prevents further inflation of the retention balloon which would cause trauma or rupture of the channel walls. The catheter may then be further inserted along the urethral channel until the retention balloon is fully within the bladder 11. Ordinarily, this may be accomplished without removing the inflating fluid from the catheter since most of the inflating fluid will be reservoired in the signal means 14 and, by design, will not exert sufficient pressure on the urethral walls to cause damage thereof. In such case, when the retention balloon has become properly positioned in the bladder 11, manual depression of the signal means 14 will then inflate the retention balloon 13. As an added safety precaution, however, the inflating fluid may be temporarily withdrawn from the catheter while the catheter is being repositioned by inserting a hypodermic syringe needle through the plug 15 in the usual manner for normally inflating and deflating a retention catheter. After the retention balloon has been properly positioned in the bladder 11, reintroduction of the inflating fluid will then inflate the retention balloon.

In FIG. 2, an inflated reservoir 22 and a clamp 23 are shown constructively. With this type catheter, the reservoir is preinflated, its pressure being retained by the clamp. On release of the clamp, the retractive force of the reservoir in deflating provides fluid pressure sufficient to inflate the retention balloon 13 if unimpeded or, as in this invention, if the retention balloon is impeded, to inflate the signal means 14. With this type catheter the fluid may be removed with a hollow needle and syringe through the plug 15 in the usual fashion.

In FIG. 3 is illustrated a portion 30 of an insertion tube 31 which contains a main lumen 36 in the main arm 32 and an inflation lumen 37 which extends from the side arm 33 into the main arm 32 and connects to the retention balloon 34 through the port 39 in the main arm 32. The signal means 35 on the side arm 33, shown in its activated, inflated state, is a formed dilatation in the inflation lumen 37. The walls 40 of the signal means 35, when the signal means is in its unactivated, uninflated state, are substantially the same thickness as the walls 41 and 42 of the adjacent portions of the inflation lumen and are of greater thickness than the walls of the retention balloon 34. The retention balloon 34 is intended to partially inflate against the walls of a body channel 38. The amount of pressure which the retention balloon 34 may exert on the body channel 38 will vary with the particular type of channel and the maximum pressure which the channel will withstand without damage. The maximum obviously should not be approached under ordinary conditions and the shape and dimensions of the signal means 35 should be properly selected so that it inflates at pressures short of this maximum. In this embodiment, therefore, activation of the signal means 35 by its inflation gives visual warning that the pressure within the retention balloon has reached a preselected value, and, in addition, prevents further inflation of the retention balloon which would cause trauma or rupture of the channel walls.

Methods for making dipped latex catheters of the double lumen type with inflatable retention means are well known in the art. These methods involve using a large dipping rod with a longitudinally disposed half-round groove, and a wire mandrel which is bent at one end. After the rod, including the groove, has been dipped and coated with latex, with sufficient thickness in the groove to constitute the inner wall of the smaller inflation lumen, the wire mandrel, which also may have been dipped and coated with latex, is placed in the groove along the entire length of the groove and with its bent end extending outwardly away from the rod so as to form the inflation side arm, and further dipping is carried out. After the dipping is completed, except for the formation of the inflatable retention balloon, a hole is formed in the inflation lumen in the area where the retention balloon is to be formed, and this hole is filled with bentonite. The pattern of the inflation balloon is then applied in bentonite to the catheter. Further dips of the insertion end of the catheter cause the latex to adhere to the catheter adjacent the bentonite but to form a nonadherent skin over the bentonite. This skin, when the underlying coating material and the hole plug are washed away, constitutes the inflation retention portion of the catheter.

The safety indicator catheters of the present invention may be made by a simple modification of the manufacturing methods described above, requiring no additional manufacturing or testing steps and no additional likelihood of catheter rejects. Their construction involves enlargement of one section of the inflation side arm mandrel and then proceeding with the normal manufacturing steps. The result is that the coagulating latex takes the shape of this enlarged mandrel, leaving a formed dilatation in the inflation lumen, with the wall thickness of the dilatation being substantially the same as the wall thickness on either side of the dilatation. Due to the uniform wall thickness, the inflation side arm remains stable and will not kink or become twisted.

Since the internal fluid pressure necessary to cause inflation of a given inflatable structure is inversely proportional to the radius of that structure, the dilatation in the inflation side arm, in effect, designates a sensitive area of inflatability in the side arm. Furthermore, since the internal fluid pressure necessary to cause inflation of a given inflatable structure also is directly proportional to the wall thickness of the structure, the thinner-walled retention balloon has an inflation pressure substantially less than that of the thicker-walled side arm. By forming the dilatation with a sufficiently large radius, its inflation pressure is reduced to a point approaching that of the retention balloon when the latter is unimpeded and less than that of the retention balloon when the latter is impeded by body tissue. The dilatation thus effectively serves as a safety indicator, visually signalling by its inflation when the retention balloon is misplaced or the pressure therein has reached a preselected value and also preventing further inflation of the retention balloon which would cause trauma or rupture of the body tissue.

From the foregoing, it will be apparent that the present invention provides an inflatable retention catheter or other like insertion tube, with a built-in safety indicator and having a construction capable of being manufactured as economically as the conventional inflatable retention insertion tubes. While there is shown and described herein preferred forms of the invention for purposes of illustration, it will be understood by those skilled in the art that various changes and modifications might be made therein without departing from the spirit and scope of the invention as defined by the appended claims.

I claim:

1. An insertion tube for partial insertion into an animal body opening, said tube comprising:
   a length of flexible tubing having an insertion end for insertion into an animal body opening and an outside end to be retained outside the animal body; and
   a fluid-transmitting inflation lumen extending longitudinally through said tubing from its outside end to a point at its insertion end,
      said lumen inflation lumen opening at said point into an inflatable retention means surrounding a portion of the insertion end of said tubing, a portion of the inflation lumen at the outside end of said tubing having a formed dilatation therein of increased internal dimensions thereby providing a lumen portion of enlarged first volume, the tubing wall of said lumen portion of the formed dilation having substantially the same wall thickness as the tubing wall adjacent thereto and being expandable under fluid pressure to provide an expanded formed dilatation defining a second volume greater than said first volume of the formed dilatation prior to expansion, said formed dilatation being inflatable at an internal fluid pressure greater than that pressure necessary to inflate said retention means when said retention means is unimpeded, less than that pressure necessary to inflate said retention means when said retention means is impeded by animal body tissue, and less than that pressure necessary to inflate said fluid-transmitting inflation lumen at any point spaced from said formed dilatation, to thereby provide a signal means inflatable during introduction of inflation fluid through the inflation lumen to the retention means when the latter is impeded, the volume of the formed dilatation when the retention means is inflated without impediment being unchanged from the volume thereof when the insertion tube is ready for use with the retention means in its uninflated state.

2. The insertion tube of claim 1 including a second fluid-transmitting lumen extending longitudinally through said tubing from an opening at the insertion end side of said retention means to another opening at the outside end of said tubing and wherein the outside end of said tubing is bifurcated with the inflation lumen extending into one branch of the bifurcated tubing and the fluid-transmitting lumen extending into the other branch of the bifurcated tubing.

3. An insertion tube in accordance with claim 1 in which:
   the inflatable retention means is inflated, as when the insertion tube is in an animal body opening properly positioned without impediment to the retention means;
   the inflated retention means and the inflation lumen, including the formed dilatation, is filled with an inflation fluid; and
   the quantity of the inflation fluid being no greater than the sum of the volume of the inflated retention means and the volume of the inflation lumen, including the first volume of the formed dilatation.

4. The insertion tube of claim 2 wherein said signal means is located on that branch of the bifurcated tubing into which the inflation lumen extends.

5. The insertion tube of claim 4 wherein that branch of the bifurcated tubing into which the inflation lumen extends includes an inflation fluid reservoir in communication with said lumen spaced apart from said signal means.